(12) United States Patent
Eubanks

(10) Patent No.: US 6,233,912 B1
(45) Date of Patent: May 22, 2001

(54) IMPLEMENT DECK THAT SHIFTS LATERALLY FROM SIDE TO SIDE

(76) Inventor: Furney M. Eubanks, 750 Plantation Rd., Trenton, NC (US) 28585

( * ) Notice: Subject to any disclaimer, the term of this patent is extended or adjusted under 35 U.S.C. 154(b) by 0 days.

(21) Appl. No.: 09/417,423

(22) Filed: Oct. 13, 1999

Related U.S. Application Data

(60) Provisional application No. 60/103,967, filed on Oct. 13, 1998.

(51) Int. Cl.[7] .......................... A01B 34/03; A01B 34/36; A01B 34/43; A01B 34/57; A01B 34/64
(52) U.S. Cl. .............................................. 56/15.5; 56/15.4
(58) Field of Search ..................... 56/15.4, 15.5, 56/15.2, 16.7; 281/7.17, 93.502, 93.51

(56) References Cited

U.S. PATENT DOCUMENTS

| | | | |
|---|---|---|---|
| 1,446,682 | * | 2/1923 | Witter ................... 280/7.17 |
| 1,575,618 | * | 3/1926 | Burlingame ............ 280/7.17 |
| 1,974,410 | * | 9/1934 | Caughery ................ 56/15.5 |
| 2,421,558 | * | 6/1947 | Goldsmith ............... 56/16.7 |
| 2,913,058 | * | 11/1959 | Smith et al. ............ 56/16.7 |
| 2,989,134 | * | 6/1961 | Kamulunkin et al. .... 280/93.502 |
| 3,199,278 | * | 8/1965 | Dye ........................ 56/16.7 |
| 4,182,100 | * | 1/1980 | Letter ..................... 56/16.7 |
| 4,910,893 | * | 3/1990 | Asay ....................... 56/16.7 |
| 5,613,354 | * | 3/1997 | Foster ..................... 56/16.7 |

* cited by examiner

Primary Examiner—Robert E. Pezzuto
Assistant Examiner—Arpád Fáb Kovács
(74) Attorney, Agent, or Firm—Mills Law Firm PLLC

(57) ABSTRACT

An implement deck slidingly mounted on a wheeled axle so that the deck can be moved laterally from side-to-side to extend out beyond the track of the wheels. A T-shaped handle is rotatively mounted on the implement deck and is connected through a rocker arm and linkage to the wheeled axle. When the T-handle is rotated in one direction, the deck will slide to one end of the axle and when the handle is rotated in the opposite direction, the deck will slide to the opposite end of the axle. When the deck is disposed in the center of the axle, a locking pin can be inserted to prevent any relative movement between the wheeled axle and the deck.

8 Claims, 4 Drawing Sheets

IMPLEMENT DECK THAT SHIFTS LATERALLY FROM SIDE TO SIDE

This application claims benefit of provisional application 60/103,967, filed Oct. 13, 1998.

BACKGROUND OF INVENTION

1. Field of Invention

This invention relates to machinery and particularly to wheeled machinery that can be shifted from side to side during operation.

Machinery, particularly machinery that moves over the ground quite often cannot accomplish its intended mission because wheels or other support means form obstructions.

An example of the above are grass cutting implements such as lawnmowers that have wheels mounted on all four corners of mower deck. To get the mower as close as possible to obstructions such as trees, fences, buildings, and the like, the operator usually pushes down on the lawnmower handle, raising the front wheel off the ground so the lawnmower can be more easily maneuvered to a point adjacent the obstruction. Even as a result of this and other maneuvering motions, it is still difficult to achieve the desired location due to such things as wheels blocking the obstruction.

2. Concise Explanation of Prior Art

There is no known prior art pertinent to the present invention.

BRIEF DESCRIPTION OF INVENTION

After much research and study into the above mentioned problems, the present invention has been developed to provide a system for shifting a mounted means such as a mower deck back and forth laterally.

The above is accomplished by mounting a means such as rollers on a wheeled axle with a handle connected to the deck in such a way that by rotating the handle to the left, the deck shifts to the left, and rotating the handle to the right, the deck shifts to the right, while holding the handle level, the deck remains centered relative to the wheels.

If the shiftable deck is a lawnmower deck, a front castor wheel is mounted to carry the front of the mower so that by simply rotating the T-handle, the mower deck can be moved left and right well past the track of the axle wheels allowing the deck to be "steered" around bushes, shrubs, trees, sides of buildings, fences and other obstructions without having to manually maneuver the deck as is required by fixed wheel mower decks.

The castor wheel on the front of the deck with the rear of the deck being mounted on rollers for side-to-side lateral movement relative to the rear wheels allows superb maneuverability. A rotatable handle is mounted on the deck with a rocker arm fixedly connected thereto. This rocker arm mounts to one end of a linkage with the other end being mounted on the axle. Thus, when the T-handle is rotated, the rocker arm moves back and forth causing the deck to move back and forth therewith to efficiently shift the deck in a lateral motion. When the T-handle is level, the deck is centered on the axle for more or less conventional operation.

In view of the above, it is an object of the present invention to provide a means for laterally pivoting a deck means relative to a fixed member.

Another object of the present invention is to provide a means for laterally shifting a wheel mounted deck relative to a fixed axle.

Another object of the present invention is to provide a means for shifting a mower deck laterally from side-to-side beyond the track of a pair of supporting wheels.

Another object of the present invention is to provide an improved mower-type deck that allows for closer trim work than is possible with a conventional mower.

Another object of the present invention is to provide a standard mower deck with trim capabilities without requiring additional auxiliary cutting systems.

Another object of the present invention is to provide a laterally shiftable mower deck that is operated by twisting a T-handle.

Other objects and advantages of the present invention will become apparent and obvious from a study of the following description and the accompanying drawings which are merely illustrative of such invention.

DETAILED DESCRIPTION OF PREFERRED EMBODIMENT

Figure 1:
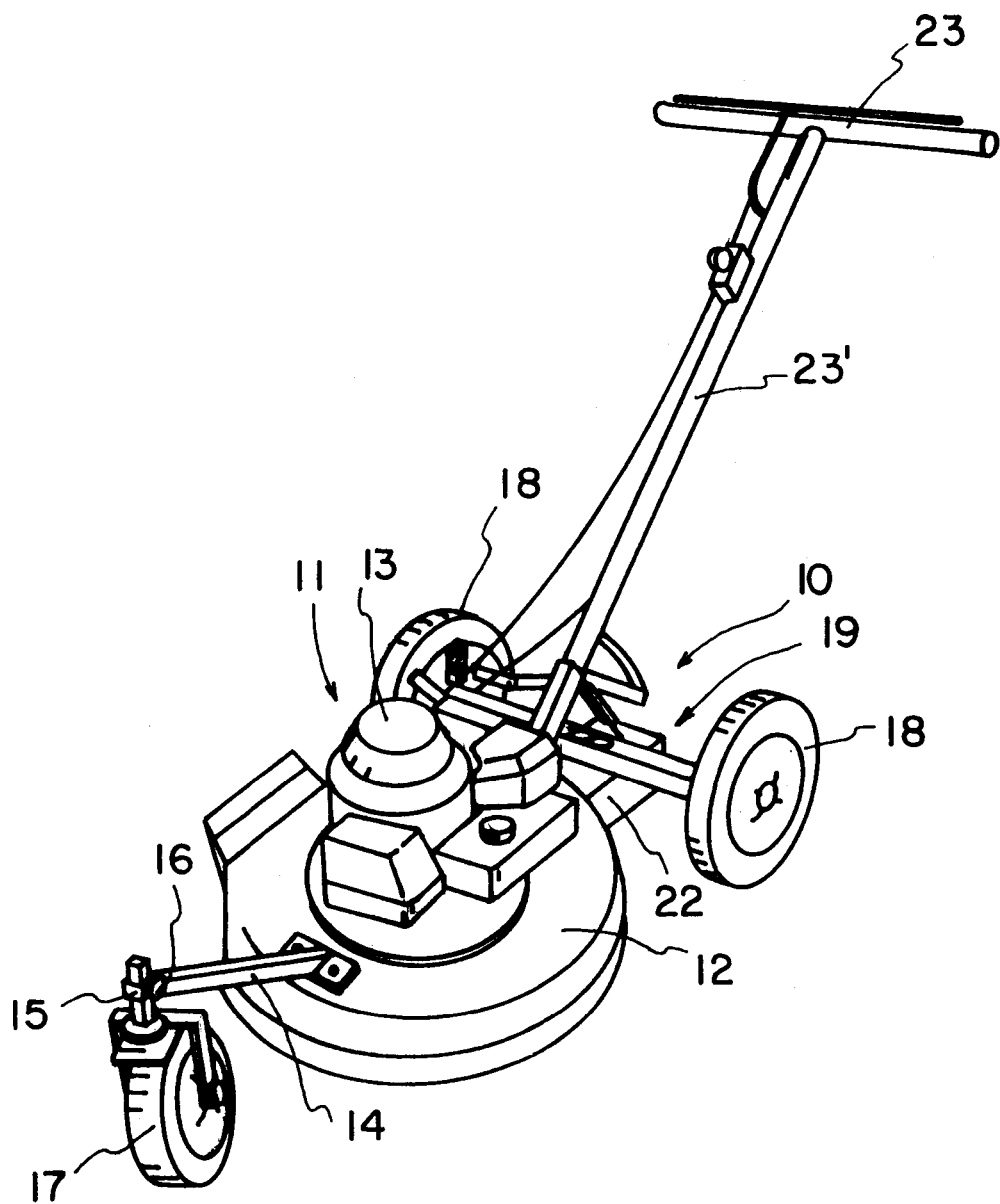
FIG. 1 is a front perspective view of the shiftable deck of the present invention.

The shifting mechanism of the present invention, indicated generally at 10, is shown mounted on a motor driven type implement, indicated generally at 11.

The present invention will hereinafter be described as used in conjunction with a mower deck. It is to be understood, however, that the shifting mechanism could be used on other types of implements.

The mower deck 12 has operatively mounted thereon an engine 13 for driving a cutting means. Since engines driving cutting means mounted on mower decks are will known to those skilled in the art, further detailed discussion of the same is not deemed necessary.

Outwardly projecting from the front of the mower deck 12 is arm 14 which terminates in a sleeve 15 with a generally vertical bore having a set screw 16 in the side thereof. A castor wheel 17 is mounted in the bore of sleeve 15 and is held in place by set screw 16. By loosening such set screw, the height of the castor wheel 17 can be adjusted relative to the mower deck 12 with the set screw then being tightened. Since height adjusting means as well as castor wheels are well known to those skilled in the art, further detailed discussion of the same is not deemed necessary.

A pair of rear wheels 18 are height adjustably mounted on an axle, indicated generally at 19. This axle is composed of a pair of facing, generally V-shaped in cross-section roller tracks 20 as can clearly be seen in FIG. 4.

Each of the rear wheels 18 are height adjustable through the loosening and tightening of set screw 21 in a similar manner as hereinabove described for the height adjustment of castor wheel 17.

A rearwardly projecting deck arm 22 is fixedly mounted on deck 12.

Figure 2:
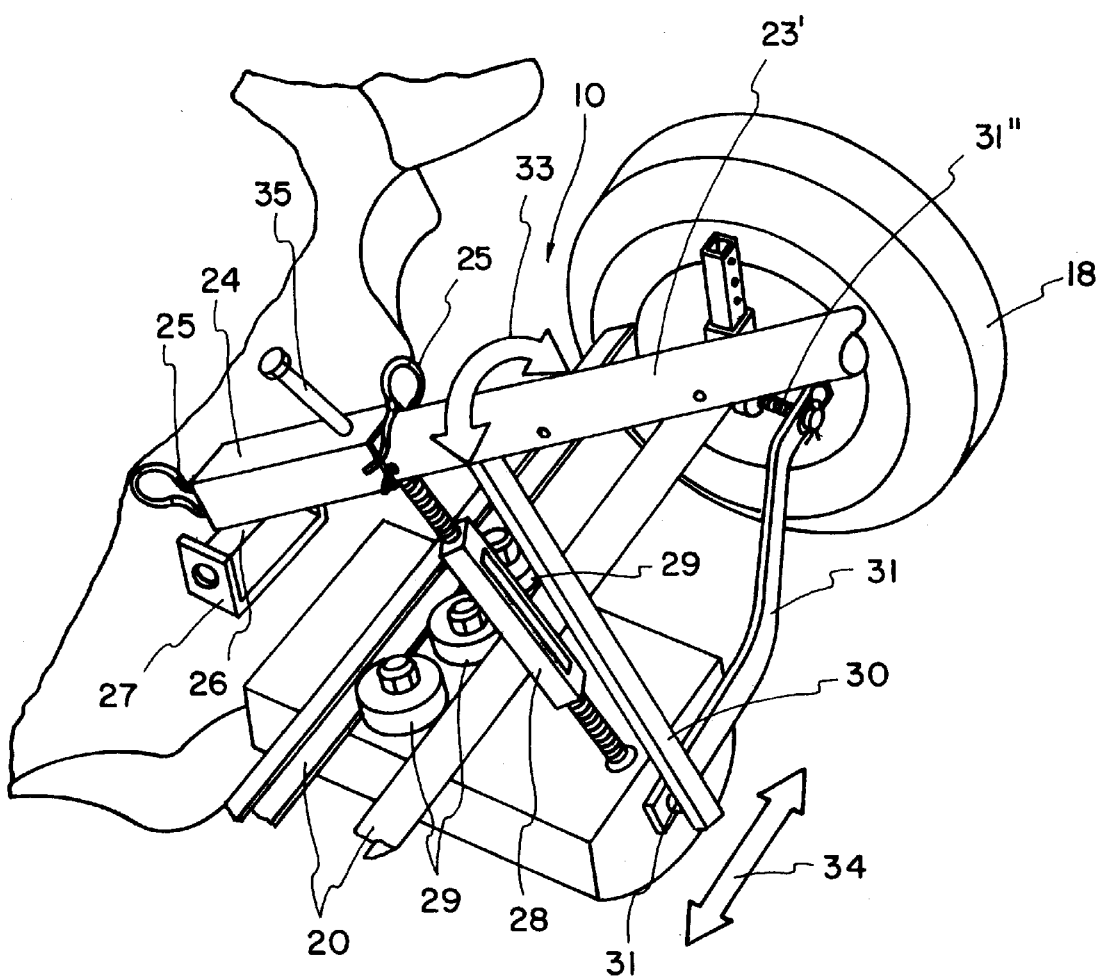
FIG. 2 is an enlarged view of the shifting system of the present invention.

A T-shaped handle 23 has a shaft portion 23' with its lower portion adjustably mounted in handle socket 24, such handle being held in place in the socket by common locking pins 25 as can clearly be seen in FIG. 2. These locking pins prevent the shaft portion from becoming disengaged from handle socket 24. Since locking pins of this type are well known to those skilled in the art, further detailed discussion of the same is not deemed necessary.

Handle socket 24 is fixedly mounted on pin 26 by means such as weldment. This pin is pivotally mounted on U-shaped bracket 27. A height adjusting means such as a turn buckle 28 has one end fixedly mounted on deck arm 22 and the other end on handle socket 24, again as can clearly be seen in FIG. 2. By turning the turnbuckle 28, the T-shaped handle mounted in handle socket 24 can be adjusted to a comfortable height for the operator (not shown) of the mower 11.

The ends of the turnbuckle 28 being secured between handle socket 24 and deck arm 22 by weldment or similar means, braces the socket to fixedly secure such socket to the mower deck 12 and the deck arm 22 (except for the height adjustment using the turnbuckle as hereinabove described).

A plurality of rollers 29 are rotatively mounted on the upper surface of deck arm 22 and engaged the facing, generally V-shaped in cross-section roller tracks 20 to allow the deck arm to easily move laterally relative to such axle.

A depending rocker arm 30 is fixedly secured, by weldment or other means, to the shaft portion 23' of T-shaped handle 23.

The outer end of the depending rocker arm 30 is pivotally mounted to one end of linkage 31 by means such as pin 31'. The opposite end of linkage 31 is pivotally mounted to axle 19 by means such as pin 32".

When the shaft portion 23' of T-shaped handle 23 is rotated in either direction as shown by arrow 33, the rocker arm 30, through linkage 31, will move the deck arm 22, along with the deck 12 mounted thereon, in directions of arrow 34.

Figure 3:
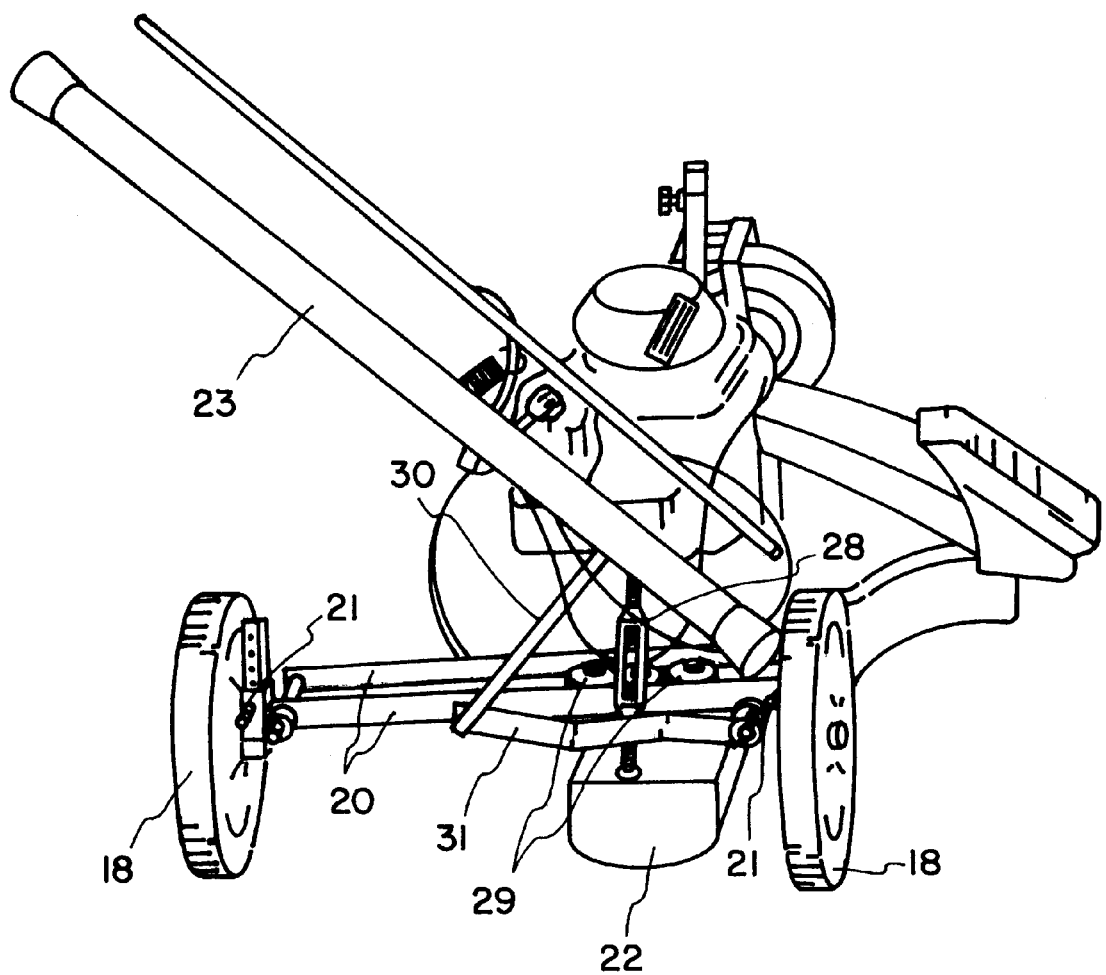
FIG. 3 is a rear perspective view with the deck shifted to the right of the axle mounted wheels.
Figure 4:
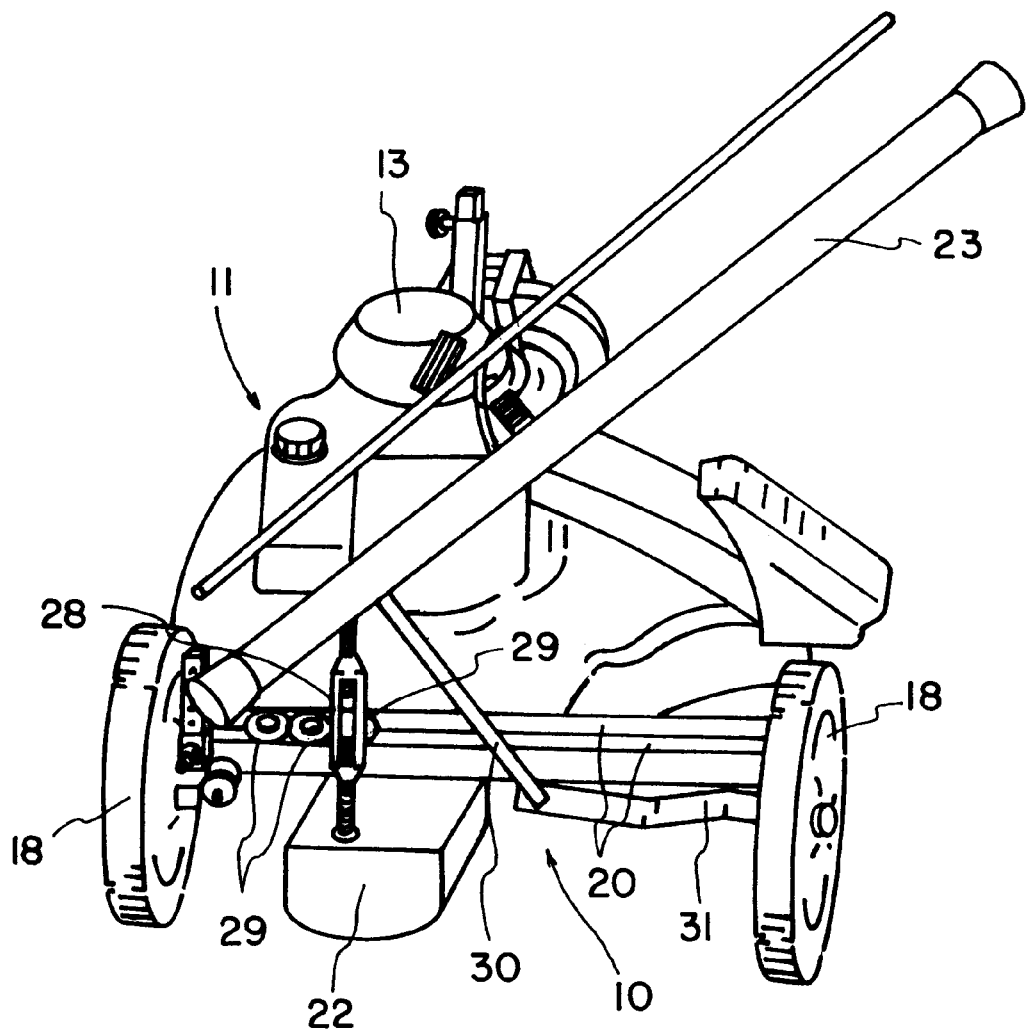
FIG. 4 is a rear perspective view of the deck shifted to the left of axle mounted wheels.

FIGS. 3 and 4 are looking down parallel to shaft portion 23' on T-shaped handle 23 to more clearly illustrate the movement of the deck relative to the wheel axle as such T-shaped handle is rotated in one direction and then the other.

When the handle 23 is rotated clock wise as shown in FIG. 3, the rocker arm 30, through linkage 31, pulls the deck 12 and everything mounted thereon to the right. When the handle 23 is rotated counter-clockwise, the rocker arm 30, through linkage 31, moves the mower deck 12 to the left as shown in FIG. 4.

When the handle 23 is rotated to a horizontal position, the deck arm 22 mounted on deck 12 will be centered between the rear wheels as shown in FIG. 1.

If it is desired to use the mower in its centered position, such as cutting grass where no obstacles are to be encountered, locking pin 35 can be inserted into an opening in handle socket 24 and into a second opening (not shown) in the top of handle shaft 23' to prevent the T-shaped handle 23 from being rotated in either direction. In other words, when handle is locked to the mower deck, it locks the axle 19 mounting rear wheels 18 relative to the deck 12.

By simply removing the locking pin 35 allows the T-handle 23 to again adjust the relative relationship between axle 19 and deck 12.

From the above it can be seen that the present invention provides a means for allowing implements mounted on a deck-type structure to be shifted from side-to-side to allow close trim or other functions to be accomplished adjacent obstacles such as trees, fences, buildings and the like. This relative movement between the rear wheels and the deck can be locked when desired and the system will function as a single unit with no relative movement between the wheels and the deck.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A shifting mechanism for implements comprising:
 a deck;
 a wheeled axle;
 means for slidingly mounting the deck on the wheeled axle;
 a handle rotatively mounted on the deck; and
 a rocker arm and a pivotally mounted linkage means linking said rotatable handle on said deck to the wheeled axle thereby when the handle is rotated in one direction, the deck will slide laterally in one direction on the axle and when the handle is rotated in the opposite direction, the deck will slide laterally on the axle in the opposite direction.

2. The shifting mechanism of claim 1 wherein the wheeled axle slidingly mounts the deck on rollers that run in a pair of opposed parallel channels.

3. The shifting mechanism of claim 1 wherein the rotatable handle is height adjustable.

4. The shifting mechanism of claim 3 wherein a turnbuckle is used to adjust the height of the handle.

5. The shifting mechanism of claim 1 wherein a means for preventing rotation of the handle is provided.

6. The shifting mechanism of claim 5 wherein the means for preventing the handle from rotating is a locking pin.

7. The shifting mechanism of claim 1 wherein the deck is a mower deck.

8. The shifting mechanism of claim 7 wherein the mower deck includes at least one additional castor wheel on the opposite side of said deck from said wheeled axle.

* * * * *